United States Patent
Meyer

(10) Patent No.: US 8,041,538 B2
(45) Date of Patent: Oct. 18, 2011

(54) ESTIMATING OF THE AMPLITUDE OF A NOISY BINARY SIGNAL

(75) Inventor: Jacques Meyer, Saint Martin le Vinoux (FR)

(73) Assignee: STMicroelectronics S.A., Montrouge (FR)

( * ) Notice: Subject to any disclaimer, the term of this patent is extended or adjusted under 35 U.S.C. 154(b) by 884 days.

(21) Appl. No.: 11/481,339

(22) Filed: Jul. 5, 2006

(65) Prior Publication Data

US 2007/0021851 A1 Jan. 25, 2007

(30) Foreign Application Priority Data

Jul. 5, 2005 (FR) ...................................... 05 52038

(51) Int. Cl.
*G06F 19/00* (2011.01)
*G06F 17/18* (2006.01)

(52) U.S. Cl. .............. 702/179; 702/62; 702/70; 702/71; 702/180; 702/181; 702/190; 702/191; 702/192; 702/193; 702/194; 702/199; 375/329

(58) Field of Classification Search .................. 375/329; 702/69–71, 179–181, 190–194, 199
See application file for complete search history.

(56) References Cited

U.S. PATENT DOCUMENTS

| 4,687,999 A | 8/1987 | Desperben et al. |
| 6,064,966 A * | 5/2000 | Beerends ....................... 704/500 |
| 2005/0123084 A1 | 6/2005 | Menkhoff |
| 2005/0229053 A1* | 10/2005 | Sunter ........................... 714/724 |
| 2006/0050805 A1* | 3/2006 | Chen et al. ..................... 375/295 |

OTHER PUBLICATIONS

Bruce Carlson: "Communication Systems" 1986, McGraw-Hill International Editions XP00237113, p. 143-144.*
French Search Report from French Patent Application 05/52038, filed Jul. 5, 2005.
John G. Proakis: "Digital Communications" 1995, McGraw-Hill International Editions XP002371132, p. 247, p. 249.
A. Bruce Carlson: "Communication Systems" 1986, McGraw-Hill International Editions XP00237113, p. 143-p. 144.

* cited by examiner

*Primary Examiner* — Dac Ha
*Assistant Examiner* — Tanmay Shah
(74) *Attorney, Agent, or Firm* — Lisa K. Jorgenson; William R. McClellan; Wolf, Greenfield & Sacks, P.C.

(57) ABSTRACT

A method and a device for estimating a first value of a signal formed of a series of values corresponding either to the first value or to a second value equal to the opposite of the first value, where the signal can take values other than the first and second values due to noise.

5 Claims, 4 Drawing Sheets

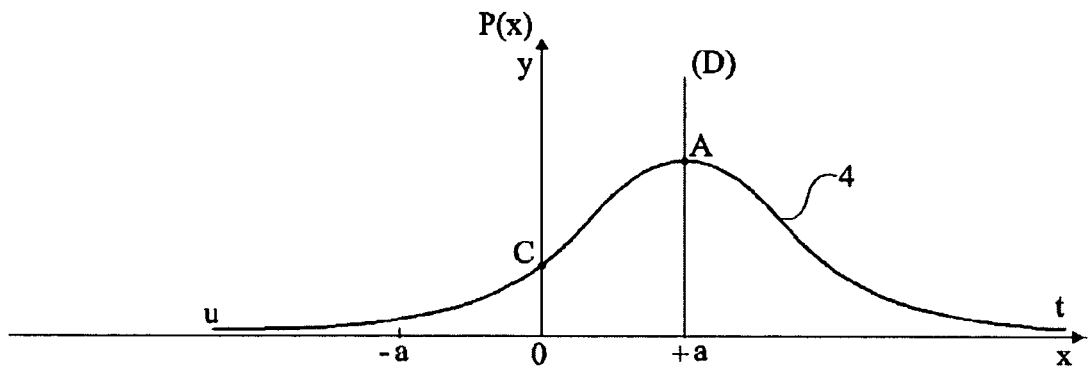
Fig 4A
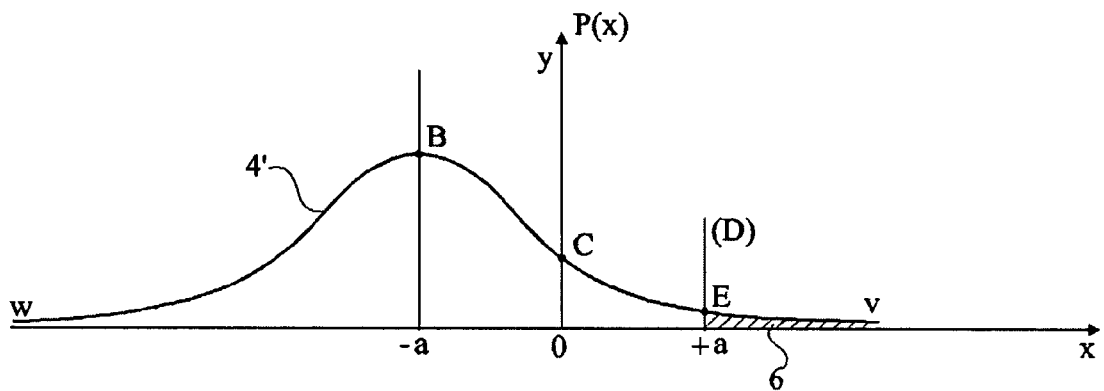
Fig 4B
| S/N (dB) | ∞ | 6 | 3 | 0 | -3 | -6 |
|---|---|---|---|---|---|---|
| RMS | 1 | 1.118 | 1.225 | 1.41 | 1.73 | 2.23 |
| ABS.VAL. | 1 | 1.008 | 1.050 | 1.16 | 1.4 | 1.79 |
| FIG 3A,3B | 1 | 1<e<1.001 | 1.004 | 1.05 | 1.21 | 1.52 |
| FIG 4A,4B | 1 | 1<e<1.001 | 1.002 | 1.025 | 1.12 | 1.31 |
Fig 5

ESTIMATING OF THE AMPLITUDE OF A NOISY BINARY SIGNAL

BACKGROUND OF THE INVENTION

1. Field of the Invention

The present invention relates to the field of transmissions, especially of binary symbol transmissions.

2. Discussion of the Related Art

Symbols or data exhibiting two possible values, for example, +1 and −1, are transmitted. After transmission, due to noise, the values of the received symbols distribute around two values, which will be designated as +a and −a.

FIG. 1 shows an example of distribution of the received values. On abscissa axis Ox is plotted value $x_i$ of the received symbol. Probability $P(x_i)$ of receiving value $x_i$ is plotted on ordinate axis Oy. The received values organize according to a curve 1 centered on positive value +a and a curve 1' centered around negative value −a.

Since the symbol demodulation generally requires accurately knowing values +a and −a, it will be necessary to estimate value a in as accurate a way as possible.

A first conventional method to determine the value of a comprises measuring the root-mean-square value of the signal over several successive symbols $x_i$. The formula providing the estimated value of a, $a_{est}$, then is:

$$a_{est} = \sqrt{\frac{1}{N}\sum_i x_i^2} \qquad (1)$$
$$= \sqrt{\frac{1}{N}\sum_i (a+n_i)^2}$$
$$\approx \sqrt{\frac{1}{N}(\sum_i a^2 + \sum_i n_i^2)}$$

in which $n_i$ represents the noise affecting value $x_i$ and N represents the number of symbols.

When the noise is very low, formula (1) provides a value $a_{est}$ equal or very close to +a provided that, as is generally the case, the average value of the noise is zero and the series of values $x_i$ is non-correlated with the noise.

Another conventional method to determine the value of +a is to calculate the average of the absolute value of the received values, which results in the following formula:

$$a_{est} = <|x_i|> = <|a+n_i|> \qquad (2)$$

This estimate also provides the value of +a in relatively accurate fashion if the noise is not too high.

A problem is however posed for very noisy environments, for example, when noise n is greater than the value of a, as in FIG. 2.

In FIG. 2, curve 2 shows the distribution of the received values $x_i$ corresponding to the sending of a positive symbol. Curve 2 exhibits a maximum A for value x=+a and exhibits two portions At and Au on either side of point A. In FIG. 2, the noise is greater than in FIG. 1 and curve 2 cuts ordinate axis Oy at a point C. Portion Cu of curve 2 corresponds to negative received values, while they correspond to positive sent symbols. For portion Cu of curve 2, the received values are affected with a noise greater than a.

Curve 2' shows the distribution of received values $x_i$ corresponding to the sending of a negative symbol. Curve 2' exhibits a maximum B for value x=−a and two portions Bv and Bw on either side of point B. Curve 2' cuts ordinate axis Oy at point C.

For an area 3 limited by the abscissa axis and curve portions Cu and Cv, any received value $x_i$ may correspond either to a positive sent symbol (point P), or to a negative sent symbol (point Q). These values are a cause of errors in the above-described conventional estimates, the error increasing as the noise increases.

From a given signal-to-noise ratio, the results provided by the preceding method become unexploitable.

SUMMARY OF THE INVENTION

An object of the present invention is to provide a method and/or a device for estimating the value of a which is more accurate than prior art methods.

Another object of the present invention is to provide a method and/or a device for estimating the value of a which is usable when the signal-to-noise ratio is low.

To achieve these objects, as well as others, the present invention provides a method for estimating a first value of a signal formed of a series of values corresponding either to said first value or to a second value equal to the opposite of the first value, where the signal can take values other than said first and second values due to noise, comprising the steps of:

a) determining a specific quantity such that one quarter of the values of a determined number of values of the signal are greater than or equal to said specific quantity, the other values of the determined number of values of the signal being smaller than or equal to the specific quantity, and b) selecting as the first value the value of said specific quantity.

According to an embodiment of the present invention, said determined number is equal to that of all the received values of the signal.

According to an embodiment of the present invention, the specific quantity of step a) is not such that one quarter of the values of a determined number of values of the signal are greater than or equal to said specific quantity but such that half of the absolute values of the signal values are greater than or equal to said specific quantity, the other values of the determined number of values of the signal being smaller than or equal to the specific quantity.

According to an embodiment of the present invention, the method comprises a preliminary step comprising the steps of:

x1) determining the average of a number X of consecutive values of the signal; and x2) calculating for each value of said number X of values the difference between this value and the average, steps a) and b) being applied to the differences thus calculated.

According to an embodiment of the present invention, values +a and −a correspond to phases.

The present invention also provides a method for demodulating a signal modulated by means of a hierarchical 8 PSK modulation comprising a step using a method such as defined hereabove.

The present invention also provides a device for estimating a first value of a signal formed of a series of values corresponding either to said first value, or to a second value equal to the opposite of the first value, where the signal can take values other than said first and second values due to noise, comprising:

a comparator capable of receiving an input value and another value and of providing a comparison result, a multiplexer capable of receiving said comparison result and of providing one of two determined values, an adder capable of adding said other value to the value provided by multiplexer and of providing a result, and a memory capable of storing the result provided by the adder, said other value corresponding to the content of the memory and to the estimate of the first value.

According to an embodiment of the present invention, one of the two determined values provided by the multiplexer is equal to $+3\epsilon$, and the other is equal to $-\epsilon$, $\epsilon$ being a parameter.

According to an embodiment of the present invention, parameter $\epsilon$ has a greater value at the beginning than during the device operation.

The foregoing objects, features, and advantages of the present invention, as well as others, will be discussed in detail in the following non-limiting description of specific embodiments in connection with the accompanying drawings.

BRIEF DESCRIPTION OF THE DRAWINGS

FIGS. 3A, 3B, 4A, and 4B are diagrams showing the distribution of a received signal to illustrate the present invention;

FIG. 5 is a comparative table of the errors provided by conventional methods and the methods according to the present invention;

DETAILED DESCRIPTION

Figure 1:
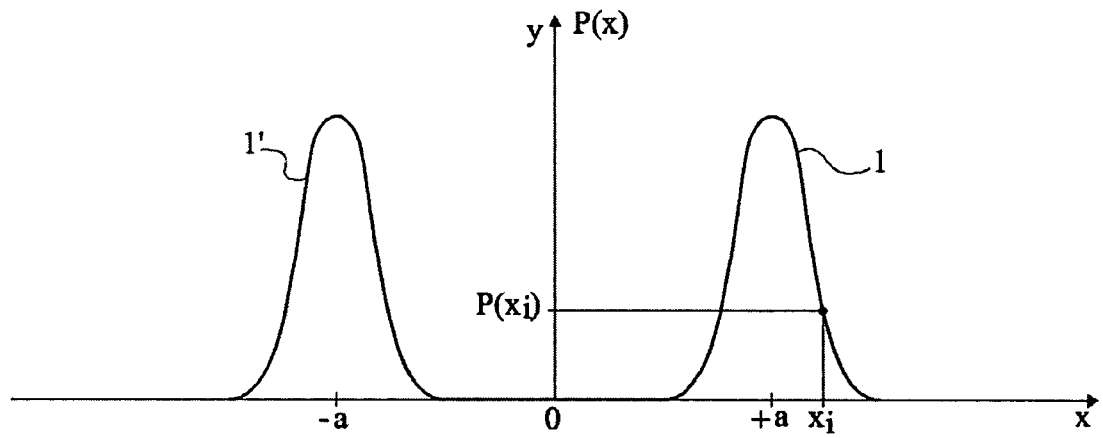
FIGS. 1 and 2, previously described, are diagrams showing the distribution of a received signal.

For clarity, the same elements have been generally designated with the same reference numerals in the different drawings and, further, the various drawings are not to scale.

Figure 3A:
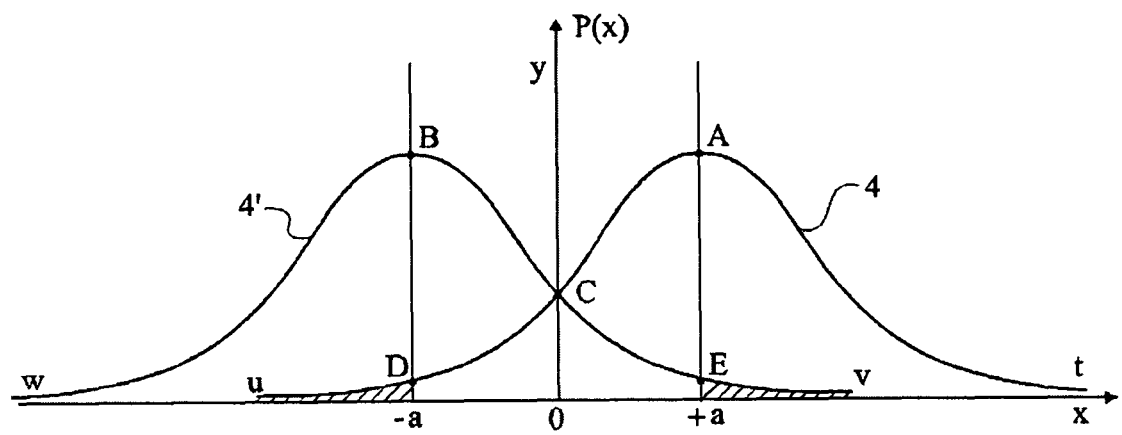

FIG. 3A shows the distribution of the values of a received signal tainted with significant noise. Typically, noise $n_i$ may be greater than 2a, a being the absolute value of the received symbols in the absence of noise. A curve 4 shows the probability of receiving a value $x_i$ corresponding to a positive symbol and a curve 4' corresponds to the probability of receiving a value $x_i$ corresponding to a negative symbol. The distributions being symmetrical, curves 4 and 4' each encounter the ordinate axis at point C. Further, curve 4 encounters a straight line parallel to the ordinate axis and of abscissa –a at point D. Curve 4' encounters a straight line parallel to the ordinate axis and of abscissa +a at point E. Points D and E are symmetrical with respect to the ordinate axis. For portion Du of curve 4 and portion Ev of curve 4', noise $n_i$ is greater than 2a.

The diagram of FIG. 3A thus shows a very noisy environment, in which conventional methods for estimating a are inoperative.

The method according to the present invention will now be explained, as well as how it enables more accurate determination of value a than in prior art.

Figure 3B:
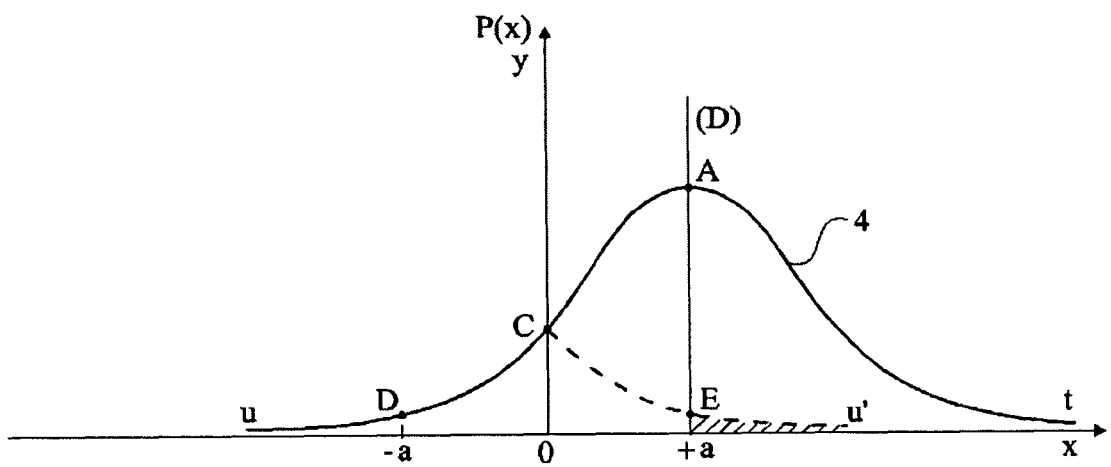

FIG. 3B shows curve 4 of FIG. 3A. Assume that the absolute values of the received values $x_i$ corresponding to positive transmitted symbols are shown. These absolute values distribute on a curve CAt corresponding to the positive abscissas of the points of curve 4 and a curve Cu', shown as a broken line in FIG. 3B, symmetrical to curve Cu with respect to ordinate axis Oy. Since distributions 4 and 4' are symmetrical, curve Cu' passes through point E and corresponds to curve Cv.

It should be noted that if the absolute values of the symbols corresponding to curve 4' are taken, a curve formed of portions CAt and Cu' is also obtained, curves 4 and 4' being symmetrical with respect to the ordinate axis.

According to a first embodiment of the present invention, the median of the absolute values of the received population is determined, that is, statistic quantity S such that there are as many absolute values greater than S and smaller than S is determined.

According to the first embodiment of the present invention, the median thus calculated is taken to estimate the value of a. The median of the absolute values indeed provides an approximate value of a more accurate than in prior art. The reasons for this are the following. If the noise was lower than 2a, curve Cu' would be entirely located between the ordinate axis and straight line D of equation x=+a. In this case, regarding curve 4, all the absolute values to the right of straight line D would correspond to values greater than a and all the absolute values to the left of straight line D would correspond to values smaller than a. The same would hold true for curve 4', all the absolute values to the right of straight line D corresponding to values lower than –a. Still regarding curve 4', the absolute values to the left of straight line D would correspond to values greater than –a (and lower in absolute value than a). Accordingly, straight line D would exactly separate the population of the absolute values of the received values in two equal parts for noises lower than a.

When the noise is greater than 2a, as in FIGS. 3A and 3B, the absolute values corresponding to curve Eu' will be accounted for as values greater than a while they are smaller than a. Thus, for curve 4, the values which will be a cause of error are the values corresponding to curve Eu'. On the whole (curves 4 and 4'), the values causing errors are those which correspond to curve portions Du and Ev of FIG. 3A. For a better appreciation of the values causing errors, the areas located between curves Du, Ev, Eu' and the abscissa axis have been hatched in FIGS. 3A and 3B.

Figure 2:
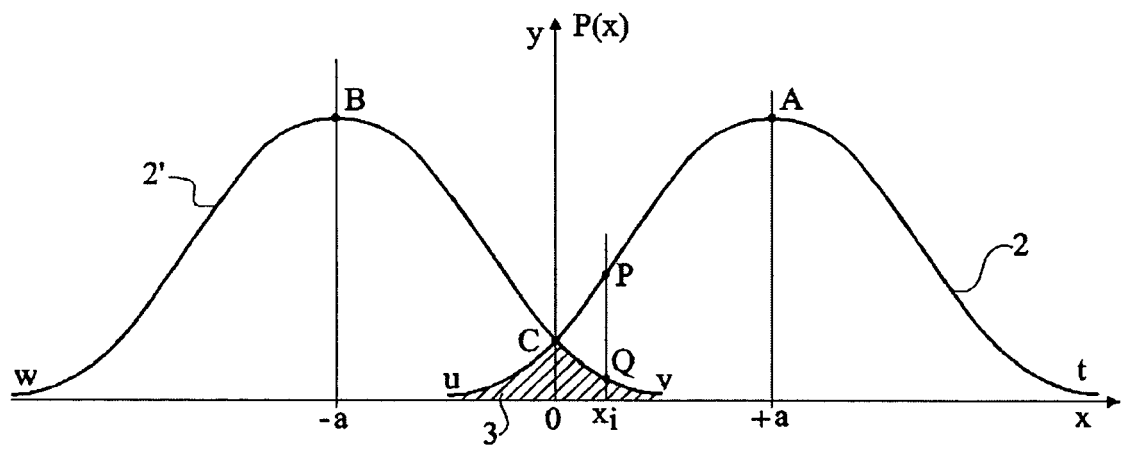

Comparing the first embodiment of the present invention and the prior art 30 described in relation with FIG. 2, it should be noted that, according to this first embodiment of the present invention, the values causing errors are by a much lower number than in prior art. Indeed, in prior art, all the values corresponding to curves Cu and Cv are a cause of errors (area 3) while, in the present invention such as described up to now, only the values corresponding to curves Du and Ev are a source of error. Curve portions CD and CE, which are sources of error in prior art, now take part in an exact determination of a.

However, for a very low signal-to-noise ratio, it may be desirable or necessary to estimate value a in a still more accurate fashion, and this can be obtained by means of a second embodiment of the present invention, described hereafter in relation with FIGS. 4A and 4B.

FIG. 4A shows curve 4 of FIGS. 3A and 3B, and FIG. 4B shows curve 4' of FIG. 3A.

According to the second embodiment of the present invention, the median of the absolute values of the received values is no longer taken, but a statistical quantity T is determined such that one quarter of the received values are greater than quantity T and three quarters of the received values are smaller than quantity T. Quantity T is then taken as the estimated value of a. The second embodiment of the present invention provides a more accurate estimate of the value of a. The reasons for this are the following.

Consider FIG. 4A. Straight line D, having equation x=a, divides curve 4 into two symmetrical portions At and Au. There are as many received values greater than a (curve At) than received values smaller than a (curve Au). Now consider the relation between straight line D and curve 4' (FIG. 4B). All the values of curve 4' are to the left of straight line D, except for the values corresponding to curve Ev. If the noise was lower than 2a, curve Bv would be entirely to the left of straight line D and straight line D would separate the received population into two portions exactly corresponding to quantity T: one quarter of the population greater than T (upper half of curve 4) and three quarters of the population smaller than T (curve 4' and lower portion of curve 4).

Accordingly, for a noise greater than 2a, the received values which are error sources in the above-described method are the values corresponding to curve Ev. For a better readability of the error source values, the area located between curve Ev and the abscissa axis, numbered with 6, is hatched in FIG. 4B.

Thus, in the second embodiment of the present invention, the values causing an error are decreased by half with respect to the first embodiment of the present invention. This second mode will thus enable estimating quantity a with a sufficient accuracy in a more noisy environment than in the first embodiment of the present invention.

FIG. 5 is a table in which are shown comparative results between the two described conventional methods and the two embodiments of the method of the present invention. In FIG. 5, the results of the estimate of a according to the signal-to-noise ratio S/N, expressed in decibels, are noted. The methods are noted in the following order: RMS (first described prior art method), ABS. VAL (second described prior art method), FIG. 3A, 3B, for the first embodiment of the method according to the present invention, and FIG. 4A, 4B for the second embodiment of the present invention. The values of signal-to-noise ratio S/N range from infinity (no noise) to −6 dB. In the table, value 1 indicates that the estimate provides an exact value (null error) and any 1.xy value indicates that there is an error of xy % on the estimate of a. The significance of the present invention can be appreciated by comparing for example the results for a signal-to-noise ratio of +3 and −3 decibels. For S/N=3 dB, conventional methods respectively generate 22.5% and 5% errors, while the methods of the present invention exhibit an error of less than 1% (respectively 0.4% and 0.2%). For S/N=−3 dB, conventional methods respectively generate errors of 73% and 40%, while the methods of the present invention respectively exhibit 2I and 12%.

To compare the two embodiments of the method according to the present invention, reference can be made to the column corresponding to a −6 dB signal-to-noise ratio. In this case, the embodiment described in relation with FIGS. 3A, 3B enables knowing a to within 52% and that described in relation with FIGS. 4A, 4B enables knowing a to within 31% (this means that, for a signal-to-noise ratio greater than −6 dB, the real a ranges between the estimate of a $a_{est}$ and $a_{est}1.52$ in the first case, and between $a_{est}$ and $a_{est}/1.31$ in the second case). It can be acknowledged that the second embodiment of the method according to the present invention provides a better estimate than the first one and accordingly enables demodulations of particularly noisy binary data.

Those skilled in the art will easily devise devices for implementing the method according to the present invention. As an example, FIG. 6 describes a method according to the present invention enabling implementation of the second embodiment of the method of the present invention.

Figure 6:
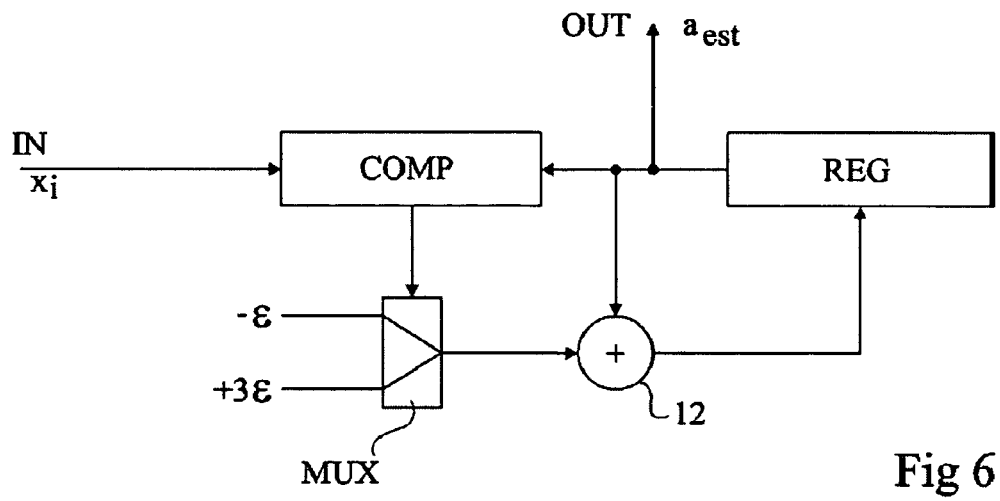
FIG. 6 shows a circuit according to the present invention.

In FIG. 6, a device for estimating quantity a comprises an input IN intended to receive received values $x_i$. The device further comprises a comparator COMP coupled to input IN and to the output of a memory REG, for example, a register. Comparator COMP has an output connected to the control terminal of a two-input multiplexer MUX. An input of multiplexer MUX receives a value −ϵ and the other input of multiplexer MUX receives a value +3ϵ. Multiplexer MUX comprises an output connected to an input of an adder 12. Adder 12 comprises another input coupled to the output of memory REG. Adder 12 comprises an output driving memory REG. The output of memory REG, coupled, as seen, to comparator COMP and to adder 12, is further coupled to an output OUT to provide the estimated value of quantity a, $a_{est}$.

The operation of the device of FIG. 6 is the following. Input IN receives received values $x_i$, one after the others. Memory REG initially stores any value, for example, 0, and later stores value $a_{est}$ which corresponds to the estimate of quantity a. Comparator COMP compares received value $x_i$ with the value stored in memory REG. If $x_i$ is greater than $a_{est}$, multiplexer MUX transmits value +3ϵ to adder 12. Adder 12 adds value +3ϵ to $a_{est}$ and replaces the content of memory REG with $a_{est}$+3ϵ, which becomes the new value of $a_{est}$. If, conversely, $x_i$ is smaller than $a_{est}$, multiplexer MUX transmits value −ϵ to adder 12. Adder 12 then subtracts value ϵ from $a_{est}$ and replaces the content of memory REG with $a_{est}$−ϵ. A loop is ended and the new value of $a_{est}$ is available in memory REG for the processing of the next received value $x_i$.

Along the arrival of values $x_i$, value $a_{est}$ stored in memory REG ends up stabilizing around statistical quantity T which has been defined in relation with the second embodiment of the present invention (statistical quantity such that one quarter of the population is above statistical value T and three quarters of the population are under value T).

The value of ϵ may be fixed or not along the device operation. Indeed, a strong value of ϵ improves the loop stabilization speed and a low value of ϵ enables a better accuracy of the final value. A relatively high value ϵ may, for example, be taken at the beginning of the device operation, then decreased. The value of ϵ is not critical. For example, the value of ϵ may be on the order of one hundredth or one thousandth of the final value of $a_{est}$.

If, by chance, the received value $x_i$ is exactly equal to $a_{est}$, it may, for example, be provided for the multiplexer to let through value +3ϵ. It should be noted that it may also be provided for the multiplexer to let through value −ϵ in this case, or that means for leaving the content of memory REG unchanged may be provided.

It should further be noted that the present invention applies to any binary system, that is, to any system in which the received values correspond to two values that can come down to form +a or −a, even if they have another form at the beginning. For example, the received values may correspond to 0 and to any value X, 1, for example. To apply the present invention in this case, the average of the received values will first be established and the difference between each value and the average will be calculated so that the values to which the present invention will apply correspond to distributions centered on values −a and +a.

It should also be noted that, in the present invention, the received values do not necessarily represent amplitudes or voltage levels. For example, the received values may correspond to frequencies f1 and f2, phases ϕ1 and ϕ2, etc.

Figure 7:
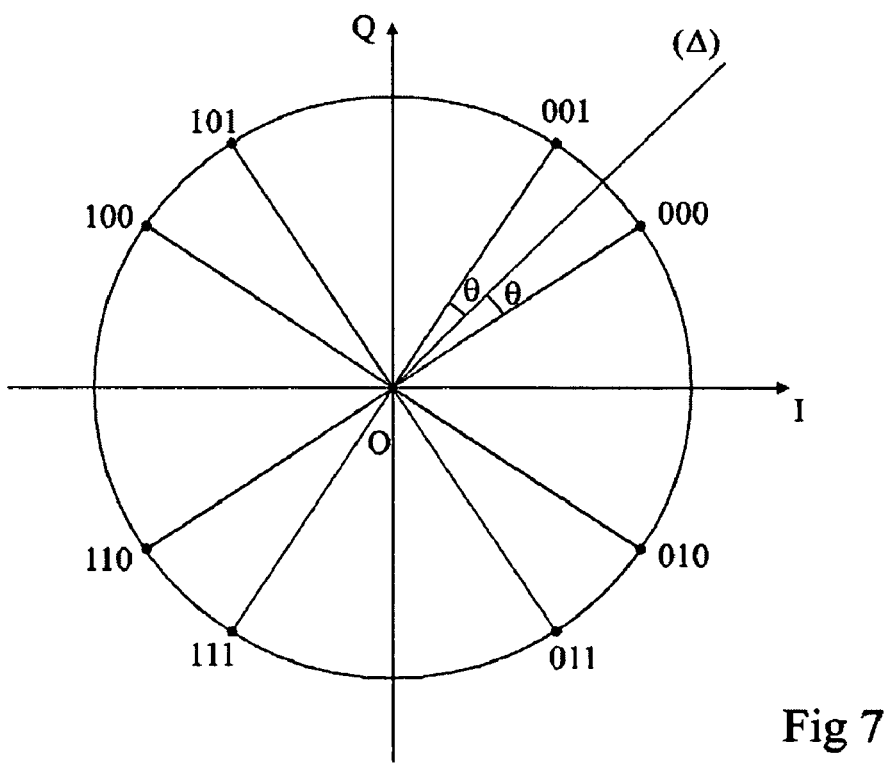
FIG. 7 shows a modulation diagram to which the present invention may be applied.

FIG. 7 shows a specific example of application of the present invention, used to discriminate values in the case of a modulation of hierarchical 8 PSK type.

In FIG. 7, phase diagram IQ comprises four quadrants. Two symbols are present in each quadrant. Since it is a hierarchical 8 PSK modulation, the symbols are not uniformly distributed. Thus, symbols 000 and 001 of the first quadrant are distributed on either side of bisector Δ of the first quadrant so that angle θ which represents the phase shift between the bisector and each of the two symbols 000 and 001 is smaller than π/4. To demodulate this type of modulation, a conventional decoder may first determine to which quadrant a received symbol belongs, then a specific decoder is necessary to determine, among the symbols corresponding to a determined quadrant, those corresponding to one or the other of the values. It thus is, at this level, a binary system where the present invention is applicable.

Thus, in FIG. 7, to determine the value of θ, all the symbols corresponding to a quadrant are first taken (the present description will be limited as an example to the first quadrant) and the difference between their phase and the phase of the quadrant bisector, here π/4 radians, is calculated. The environment generally is extremely noisy and, to determine θ, the second method according to the present invention may for example be applied, that is, statistical quantity T such that one quarter of the phase population has a phase greater than T may be determined. Phase θ is then taken to be equal to T.

Of course, the present invention is likely to have various alterations, modifications, and improvements which will readily occur to those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for estimating, by means of a circuit, a value of a signal, comprising:
    receiving a signal formed of a series of values corresponding either to a first value or to a second value equal to the opposite of the first value, where the received signal can take values other than said first and second values due to noise;
    estimating the first value of the received signal by determining a specific quantity such that one quarter of the values of a determined number of values of the signal, corresponding either to said first value or to said second value, are greater than or equal to the specific quantity, and three quarters of the values of the determined number of values of the signal are smaller than or equal to the specific quantity,
    selecting as the first value of the signal said specific quantity;
    determining the average of said determined number of values of the signal; and
    calculating for each value of said determined number of values the difference between this value and the average, the determining and the selecting being applied to the differences thus calculated.

2. The method of claim 1, wherein said determined number is equal to the number of received values of the signal.

3. The method of claim 1, wherein said first and second values correspond to phases.

4. A method for demodulating a signal, modulated by hierarchical 8 PSK modulation, using the method of claim 1.

5. A method for estimating, by means of a circuit, a value of a signal, comprising:
    receiving a signal formed of a series of values corresponding either to a first value or to a second value equal to the opposite of the first value, where the received signal can take values other than said first and second values due to noise;
    estimating the first value of the received signal by determining a specific quantity such that one quarter of the values of a determined number of values of the signal, corresponding either to said first value or to said second value, are greater than or equal to the specific quantity, and three quarters of the values of the determined number of values of the signal are smaller than or equal to the specific quantity; and
    selecting as the first value of the signal said specific quantity, wherein determining a specific quantity comprises, when a received signal value is less than a current estimated value, subtracting a parameter value from the current estimated value and, when a received signal value is greater than the current estimated value, adding three times the parameter value to the current estimated value, and wherein selecting comprises selecting the current estimated value as the first value of the signal after the determined number of values of the signal have been received.

* * * * *